Patented Oct. 27, 1931

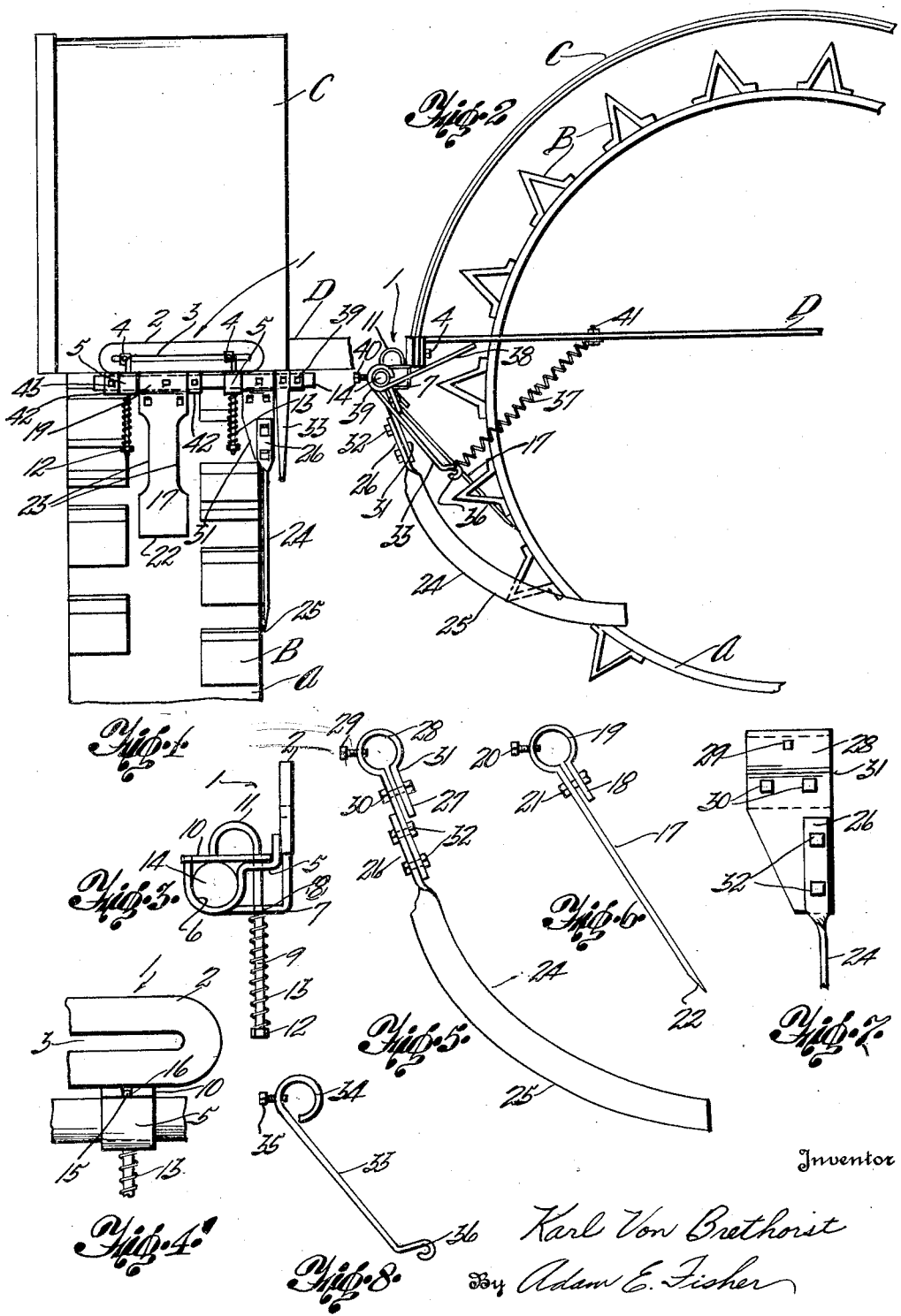

1,828,824

UNITED STATES PATENT OFFICE

KARL von BRETHORST, OF LODA, ILLINOIS

SCRAPER FOR TRACTOR WHEELS

Application filed April 3, 1930. Serial No. 441,233.

This invention is a scraper for tractor wheels.

The main object of the invention is to provide a scraper which may be readily applied to tractors of practically any type and which will operate to completely remove mud or the like from both the periphery and the edge of each wheel.

Another object is to provide a scraper assembly including a blade for scraping between the wheel lugs and a blade for scraping the inner edges of the wheel whereby mud or the like will be completely and effectively scraped from the wheel.

Another object is to provide a means whereby the blade assembly will be released from the tractor in case the knives should strike the lugs on the wheel or any obstruction which might lodge between the lugs thus preventing injury to the scraper or to the tractor.

A further object is to provide a means whereby the scraper may be readily and conveniently removed from the tractor when its use is not desired.

The foregoing and other objects together with means whereby the same may be carried into effect will best be understood from the following descripton of a preferred embodiment of the invention, taken in connection with the accompanying drawings, wherein:

Figure 1 is a rear view of the left fender and wheel of a tractor equipped with my invention.

Figure 2 is an inside view of the structure shown in Figure 1.

Figure 3 is an enlarged end view of the bracket for attaching the scraper to the tractor.

Figure 4 is an enlarged rear view of one end of the bracket.

Figure 5 is an enlarged side view of the wheel edge scraping blade and its attaching clamp.

Figure 6 is an enlarged side view of the wheel center scraping blade.

Figure 7 is an enlarged detail of the upper end of the wheel edge scraping blade and its attaching clamp.

Figure 8 is an enlarged side view of the spring arm.

Referring now more particularly to the drawing the reference character A designates the left wheel of a tractor having lugs B along each of its edges leaving a clear space between as shown. The fender C is secured to the platform D of the tractor and rests over the wheel A as shown. The foregoing elements are of conventional form and no invention is claimed therefor.

In carrying out the invention I provide an attaching bracket designated generally at 1 which comprises the back plate 2 slotted at 3 so that it may be attached to the lower rear edge of the fender C by the bolts 4 by means of which said fender is secured to the platform D. Hangers 5 are extended rearwardly from the lower edge of the plate 2 adjacent each end thereof and these hangers have U-shaped open loops 6 for a purpose to be described. L-shaped arms 7 are extended between the lower edge of the plate 2 and the lower edge of the loops 6 and both the hangers 5 and the arms 7 are provided with vertically aligned apertures 8 through which bolts 9 are slidably mounted. Clamping plates 10 are provided and the same are fixed to the bolts 9 adjacent their upper ends, these upper ends of the said bolts being then bent into the form of eyes 11 to serve as finger holds. Nuts 12 are threaded on the lower ends of the bolts 9 and expansion coil springs 13 are seated over said bolts and braced between the nuts 12 and the described arms 7. A shaft 14 is set in the loops 6 and held in place therein by the clamping plates 10 which are held downwardly in contact therewith by the springs 13. It will be understood, however, that the shaft 14 may be readily removed from the hangers 5 by grasping the eyes 11 of the bolts 9 and pulling upward so that the loops 6 are opened by the raising of the plates 10. In order to prevent the clamping plates 10 from turning and releasing the shaft 14 due to vibration of the same when in use on the tractor, small lugs 15 are extended upwardly from the outer legs of the loops 6 for engagement with notches 16 provided in the outer ends of the plates 10 for their reception.

A wheel center scraping blade 17 is provided and the same has its shank looped back upon itself at 18 providing an eye 19 to fit over the shaft 14. A set screw 20 is threaded in the eye 19 and clamping bolts 21 are provided through the blade and its looped portion by means of which the said blade may be securely clamped in any position on the shaft 14. The free end of the blade 17 is sharpened as at 22 and the blade is cut away at each side and narrowed intermediate its ends as at 23 to prevent the accumulation of mud or the like between it and the wheel A as will be understood.

The wheel edge scraping blade 24 is arcuate in form with its lower or outer edge 25 sharpened and the shank 26 of this blade is twisted a quarter turn as shown. An attaching clamp 31 is provided the same having its end looped back upon itself at 27 to provide an eye 28 for the reception of the shaft 14, said clamp being secured thereon by a set screw 29 and clamping bolts 30 as hereinbefore described with reference to the wheel center scraping blade 17. The shank 26 of the blade 24 is secured to this clamp 31 by means of the bolts 32 as shown.

A spring arm 33 is provided, the same having an eye 34 at one end for the reception of the shaft 14 to which said arm is secured by a set screw 35. The other or free end of the arm 33 is provided with a hook 36 upon which is adapted to be secured the retractile coil spring 37. A stop arm 38 is also provided and the same has an eye 39 at one end to receive the shaft 14 and a set screw 40 by means of which said arm may be secured to the shaft.

The wheel center scraping blade 17 is secured to the shaft 14 in alignment with the clear center space on the wheel A and the wheel edge scraping blade 24 is secured to the said shaft in alignment with the inner edge of the wheel. It will be noted that the side of the blade 24 adjacent the wheel 9 is vertical while the opposite side is beveled to provide the sharpened edge 25, thus preventing said blade from being forced away from the wheel by the mud thereon as will be understood. The spring arm 33 is secured on the shaft 14 inwardly of the blade clamp 31 and the stop arm 38 is then secured to the shaft inwardly of the arm 33. This arm 38 is so fixed to the shaft 14 and the blades 17 and 24 are so arranged relative to one another that the blades will be in their proper operative or scraping position as shown when the arm 38 contacts the underside of the platform D. The spring 37 connected to the hook 36 on the spring arm 33 is extended forwardly beneath the platform D and secured to a suitable bolt 41 in the platform to hold the blades 17 and 24 in their proper positions relative to the wheel A. The stop arm 38 does not allow the blade 17 to contact the wheel periphery since this would cause wear on the blade. The shaft 14 is held in its proper position against axial displacement by suitably positioned collars 42 secured in place on the said shaft by means of set screws 43.

It will be understood that this positioning of the scraping blades 17 and 24 will enable them to completely remove mud from the wheel as said wheel rotates during the usual forward movement of the tractor. The blade 24 due to its arcuate shape tends to force mud and the like outward from the wheel rim and from between the lugs thereon and this action is further aided by the blade 17 which also pushes the mud outward from the wheel causing a very effective cleaning of the tractor wheel.

It will also be understood that should a stone or other obstruction become lodged between the lugs on the tractor wheel and come in contact with the scraping blades it will cause an upward pressure on the shaft 14 causing that shaft to raise the clamp plates 10 upward to release the scraping assembly from the attaching bracket. This action prevents injury either to the tractor fender or to the scraper itself.

The device is here described as applied only to one fender of the tractor but it is understood that the same arrangement of scraping elements and their supporting means may be used on the other fender for scraping the mud from the other wheel. It will also be apparent that any of the scraping blades may be removed when their use is not desired and also that a wheel edge scraping blade similar to the blade 24 may be provided for scraping the outer edge of the wheel.

While I have herein set forth a certain preferred embodiment of the invention it is understood that I may vary from the same in minor structural details, not departing from the spirit of the invention and within the scope of the appended claims.

I claim:

In combination with a tractor wheel, fender and frame, a device of the kind described, comprising a bracket secured to the fender, hangers extended rearwardly from the lower margin of the bracket, U-shaped open loops at the ends of the brackets, arms extended from the lower margin of the bracket to the lower bight of the loops, a shaft seated in the loops, clamping plates adapted to overlie the said loops and retain the shaft therein, bolts passed rigidly through the rear ends of the clamping plates and formed into finger loops at their upper ends, the lower portions of the said bolts being passed loosely downward through the hangers and arms, nuts on the lower ends of the bolts, expansion coil springs braced between the said nuts and the arms, a wheel center scraping blade mounted on the shaft, an arcuate wheel edge scraping blade operatably mounted on the shaft in alignment with the edge of the tractor wheel, a spring arm secured on the shaft, a coil spring stretched between the said spring arm and the tractor frame, and adapted to normally rotate the shaft to bring the wheel center and edge scraping blades into operative position relative to the tractor wheel, and a stop arm adjustably secured to the shaft and adapted to engage the tractor frame whereby to limit the said rotation of the shaft under the influence of the said spring and hold the wheel center scraping blade out of actual contact with the tractor wheel.

In testimony whereof I affix my signature.

KARL von BRETHORST.